E. A. SAUNDERS.
TIRE.
APPLICATION FILED JULY 10, 1914.
1,243,114.
Patented Oct. 16, 1917.
2 SHEETS—SHEET 1.
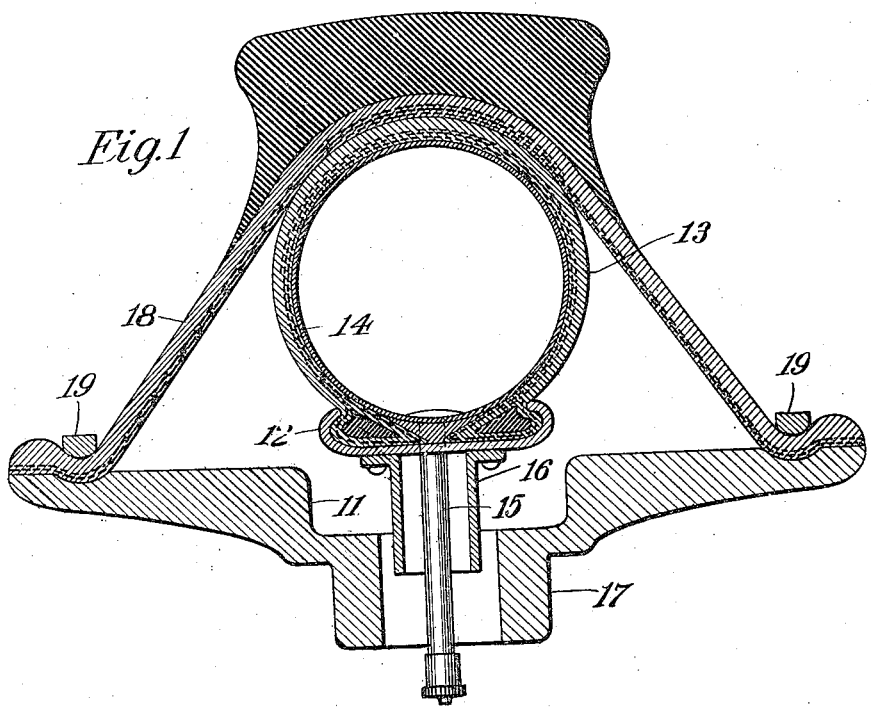
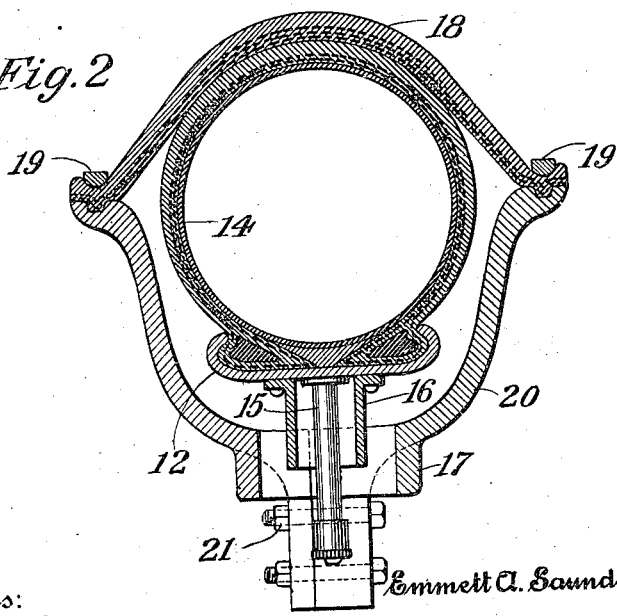
Witnesses:
Veronica Braun
Francis Boyle
Emmett A. Saunders Inventor
By his Attorney
Ernest Hopkinson

UNITED STATES PATENT OFFICE.

EMMETT A. SAUNDERS, OF MISHAWAKA, INDIANA, ASSIGNOR TO MORGAN & WRIGHT, A CORPORATION OF MICHIGAN.

TIRE.

1,243,114.   Specification of Letters Patent.   Patented Oct. 16, 1917.

Application filed July 10, 1914. Serial No. 850,150.

*To all whom it may concern:*

Be it known that I, EMMETT A. SAUNDERS, a citizen of the United States, residing in Mishawaka, county of St. Joseph, State of Indiana, have invented certain new and useful Improvements in Tires, of which the following is a full, clear, and exact disclosure.

This invention relates to tires and has for an object to provide a tire in which the pneumatic member is supported wholly by the cover or tread, and has no connection whatever with the rim, whereby the pneumatic member has no function of driving or braking the vehicle.

A further object is to provide a tire including a rim and a floating ring thereon carrying a pneumatic member, the respective centers of the rim and ring fluctuating with respect to each other during rolling contact of the tire with the ground, whereby shocks and jars are absorbed without deleterious effects on the tire.

It is customary to attach the pneumatic member of a tire rigidly to the rim, and as a result of this construction the pneumatic tire must perform a driving and braking function, shocks and jars upon the tire are communicated direct to the rim, and the fabric of the pneumatic member soon becomes destroyed due to the cracks appearing on the sides thereof near the rim.

To obviate these disadvantages, I support the pneumatic member with its attached comparatively rigid ring to float free upon the rim, by means of a cover attached to the rim, there existing a clearance space entirely around the rim underneath the ring, into which space the ring and pneumatic member move bodily as a unit in a direction radially, transversely, or in various angular directions intermediate the radial and transverse, when the tire is under compression.

The invention can readily be understood from the following description, reference being made to the accompanying drawing in which:

Figure 1 is a fragmentary cross-sectional view of a tire constructed in accordance with my invention;

Figs. 2 and 3, are fragmentary cross-sectional views showing various modified forms of the invention.

Figure 3:
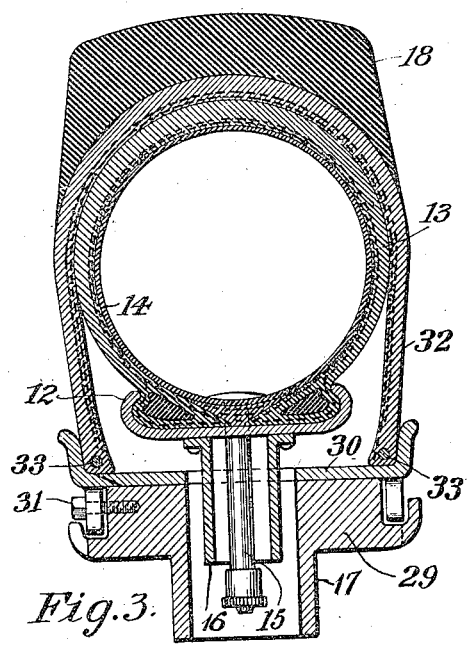

Referring to the drawing, 11 designates a channeled rim which may constitute a felly although there may be a felly independent of this rim, the rim being designed to be secured in any preferred manner to a wheel having a hub, and spokes of the usual or any preferred construction.

Surrounding this rim is a substantially inextensible or comparatively rigid flanged ring 12 of metal, wood, rubber, or other suitable material, which floats loosely on the rim, that is, it has no connection whatever with the rim, the channel of the rim constituting a clearance space which exists entirely around the rim underneath the ring. The ring carries a pneumatic member 13 which may be simply a pneumatic tube, but preferably consists of a laminated fabric carcass secured at the base to the ring, within which carcass is confined an inflatable inner tube 14 which is equipped with the usual valve 15. The valve is protected by a housing 16 which sinks into a well 17 radially formed in the rim whereby the valve may be easily reached when it is desired to inflate or test the pressure of the pneumatic member.

The pneumatic member with its attached ring is supported by a tire tread or cover 18 which is secured at the side edges to the rim by clamp rings 19, or by any other usual or preferred devices, the inflation of the pneumatic member holding the cover taut. The cover in the present embodiment is shown as of laminated cloth and rubber, but it may be of any other preferred construction, it being simply necessary that the cover have sufficient strength and flexibility to perform its function of supporting the pneumatic member with its attached ring upon the rim.

In operation, the pneumatic member with its attached ring will move as a unit bodily into and out of the channel of the rim in a direction radially, transversely, or in various angular directions intermediate the radial and transverse, when the tire is under compression. Or in other words, the center of the ring will fluctuate around the center of the rim in taking up the compressing waves upon the tire, so that shocks and jars upon the tire are not communicated to the rim. Furthermore, this relative bodily movement of the pneumatic member and attached ring in respect to the rim promotes less distortion to the pneumatic member than usual when an obstruction is encountered, thereby diminishing the usual severe flexing of the sides of the pneumatic member near the base, so that the formation of cracks is obviated and consequently the long life of the tire is promoted.

In the modification shown in Fig. 2, I have shown the rim 20 deeply channeled and have shown one side of the rim removably secured in place by bolts 21 to facilitate application and removal of the pneumatic member. The pneumatic member, tire cover, and their component parts are constructed identical in this modification with the like parts shown in Fig. 1, and above described, and operate in the same manner, and for brevity are numbered identical therewith. In this instance also, the channel of the rim constitutes a clearance space extending around the rim underneath the ring of the pneumatic member to accommodate relative bodily movement of the ring and rim, as above described.

In the modification shown in Fig. 3, the rim 29 is of the quick demountable type employing interfitting flanges 30 which are removably secured in place as shown at 31. The cover 32, in this instance, is provided at the base with inextensible rings 33 which are confined against lateral displacement by the flanges 30. The pneumatic member and its component parts are of the same construction as shown in Fig. 1, and for brevity, are numbered identical therewith. In this instance also there exists a clearance space around the rim underneath the ring of the pneumatic member to accommodate bodily movement of the ring and pneumatic member as a unit when the tire is under compression, as above described.

While I have described and illustrated several forms of the invention, I do not limit myself to the exact forms shown, since the invention in its broadest aspect contemplates the provision of a tire in which the pneumatic member has no connection whatever with the rim, there existing a clearance space entirely around the rim underneath the pneumatic member to accommodate bodily movement of the pneumatic member relatively to the rim when the tire is under compression.

The ring may be an integral part of the pneumatic member, or the pneumatic member may be so braced or stiffened as to perform the desired functions. I also contemplate to so stiffen the pneumatic member by means of wires, hooks, etc. formed in the tire carcass itself, or perhaps even by certain fabric construction, that no separate ring would be necessary.

Having described my invention, what I claim and desire to protect by Letters Patent is:

The combination of a rim, a flanged ring surrounding and spaced from the rim, a tire carcass secured at the edges to the ring, an inner tube in said carcass, an inflating valve for the inner tube, there being a radially disposed well in the rim permitting access to the valve, a housing for the valve adapted to sink into said well and protect the valve, and a cover for the carcass secured at the edges to the rim.

Signed at Berlin, Germany, this 25th day of June, 1914.

EMMETT A. SAUNDERS.

Witnesses:
 HENRY HASPER,
 WOLDEMAR HAUPT.

Copies of this patent may be obtained for five cents each, by addressing the "Commissioner of Patents, Washington, D. C."